(12) United States Patent
Tsai (10) Patent No.: US 9,649,900 B2
(45) Date of Patent: May 16, 2017

(54) UNIVERSAL TRAILER LOCK

(71) Applicant: HANDYWAY CO., LTD., Changhua (TW)

(72) Inventor: Chin-Hui Tsai, Changhua (TW)

(73) Assignee: HANDYWAY CO., LTD., Changhua (TW)

( * ) Notice: Subject to any disclaimer, the term of this patent is extended or adjusted under 35 U.S.C. 154(b) by 0 days.

(21) Appl. No.: 15/205,424

(22) Filed: Jul. 8, 2016

(65) Prior Publication Data

US 2017/0100973 A1    Apr. 13, 2017

(30) Foreign Application Priority Data

Oct. 8, 2015    (TW) .............................. 104216179 U (51) Int. Cl.
*B60D 1/60*    (2006.01)
*B60D 1/06*    (2006.01)

(52) U.S. Cl.
CPC    *B60D 1/60* (2013.01); *B60D 1/06* (2013.01)

(58) Field of Classification Search
CPC ...................................................... B62D 1/60

USPC ............................................. 280/507; 70/237
See application file for complete search history.

(56) References Cited

U.S. PATENT DOCUMENTS

| 4,581,908 | A | * | 4/1986 | Bulle | ....................... | B60D 1/60 |
| | | | | | | 280/507 |
| 5,752,398 | A | * | 5/1998 | Villalon, Jr. | ............. | B60D 1/60 |
| | | | | | | 280/507 |
| 2006/0033309 | A1 | * | 2/2006 | Pare | ......................... | B60D 1/06 |
| | | | | | | 280/507 |
| 2006/0163842 | A1 | * | 7/2006 | Jacques | .................... | B60D 1/60 |
| | | | | | | 280/507 |
| 2007/0069501 | A1 | * | 3/2007 | Hsai | ........................ | B60D 1/60 |
| | | | | | | 280/507 |

* cited by examiner

*Primary Examiner* — Tony Winner
(74) *Attorney, Agent, or Firm* — Guice Patents PLLC (57) ABSTRACT

A universal trailer lock including an upper housing, a lower housing, a lock barrel set and a latch. A limit separator is further included, wherein the limit separator is provided to embed into a limiting groove of the upper housing. By the composition of above structure, the universal trailer lock may applied to trailer couplers with different specifications for effectively prevent trailers from being stolen.

6 Claims, 9 Drawing Sheets

UNIVERSAL TRAILER LOCK

BACKGROUND OF THE INVENTION a) Field of the Invention

The invention relates to a universal trailer lock and, more particularly, a universal trailer lock for tightly locking on a trailer coupler, which is applied to trailer couplers with different specifications for effectively prevent trailers from being stolen.

b) Description of Prior Art

Figure 1:
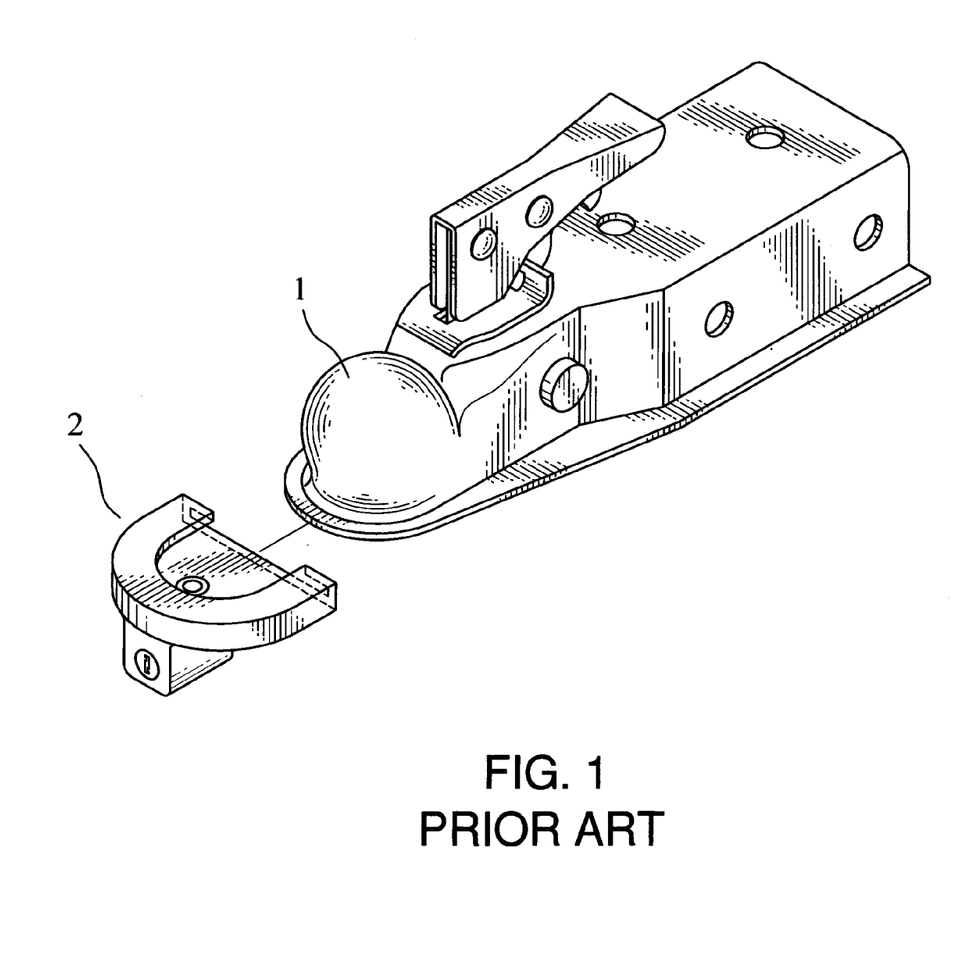
FIG. 1 is a three-dimensional schematic diagram of a conventional trailer lock.
Figure 2:
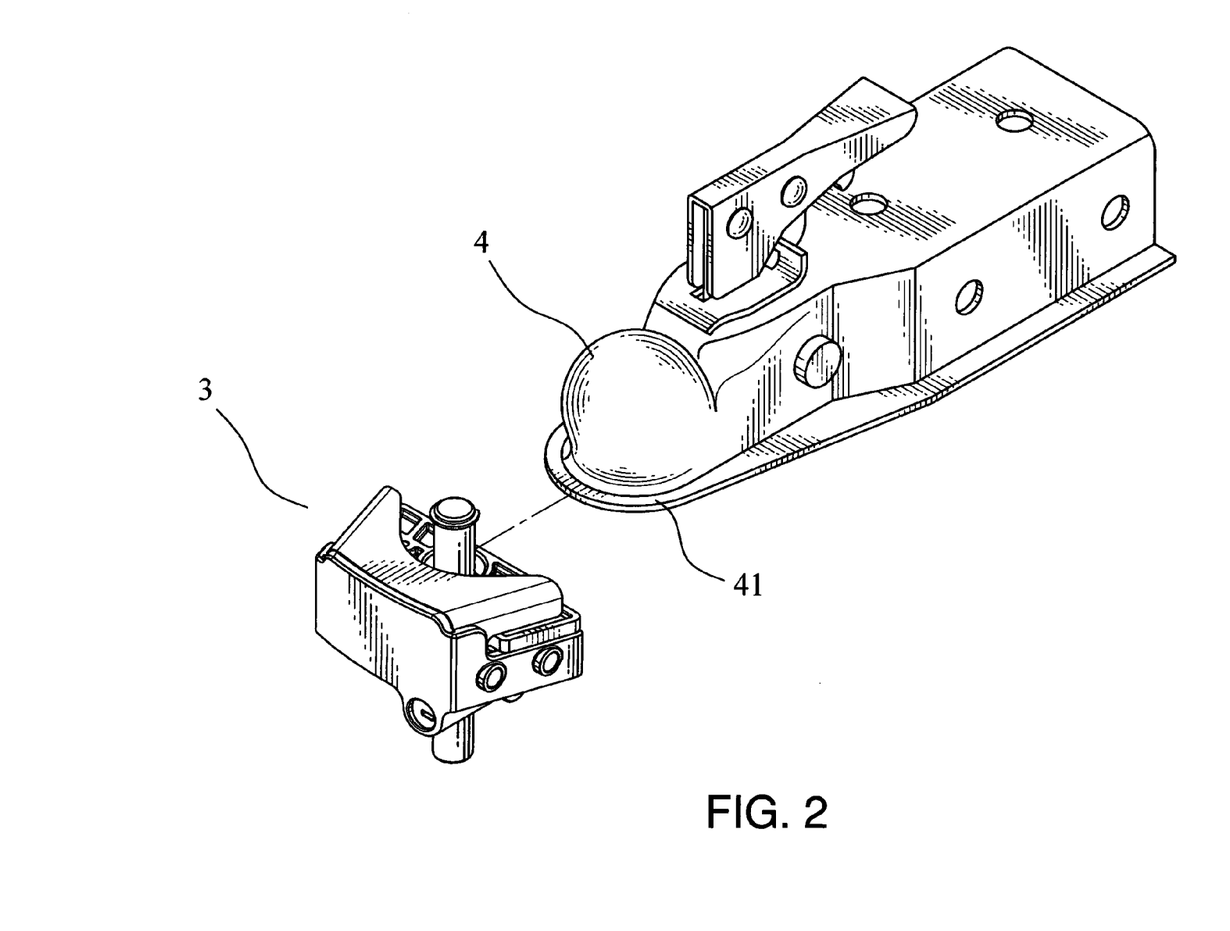
FIG. 2 is a three-dimensional schematic diagram of the present invention.
Figures 3, 4:
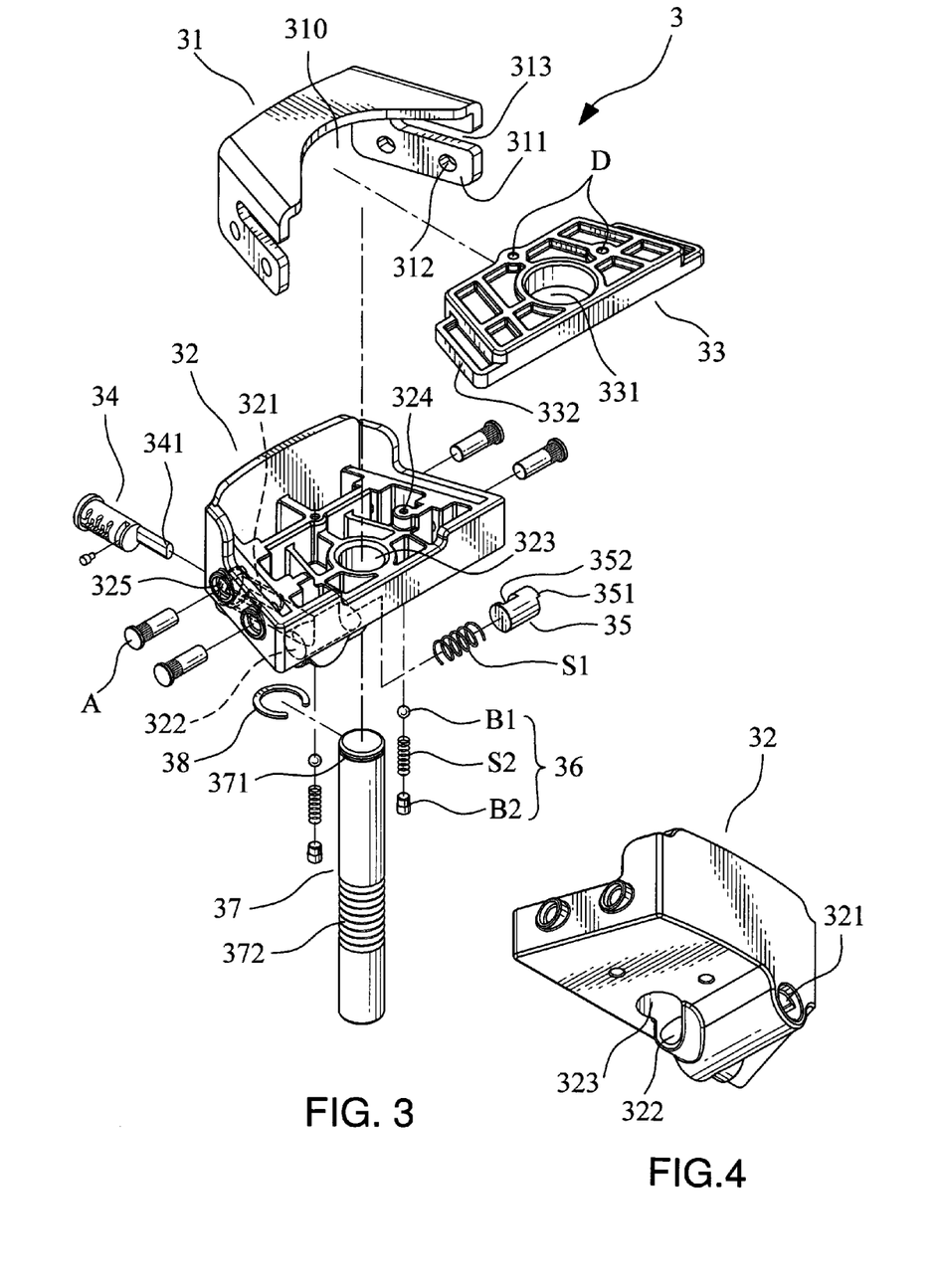
FIG. 3 is a three-dimensional exploded diagram of the present invention.
FIG. 4 is a three-dimensional schematic diagram of the lower housing of the present invention.
Figure 5:
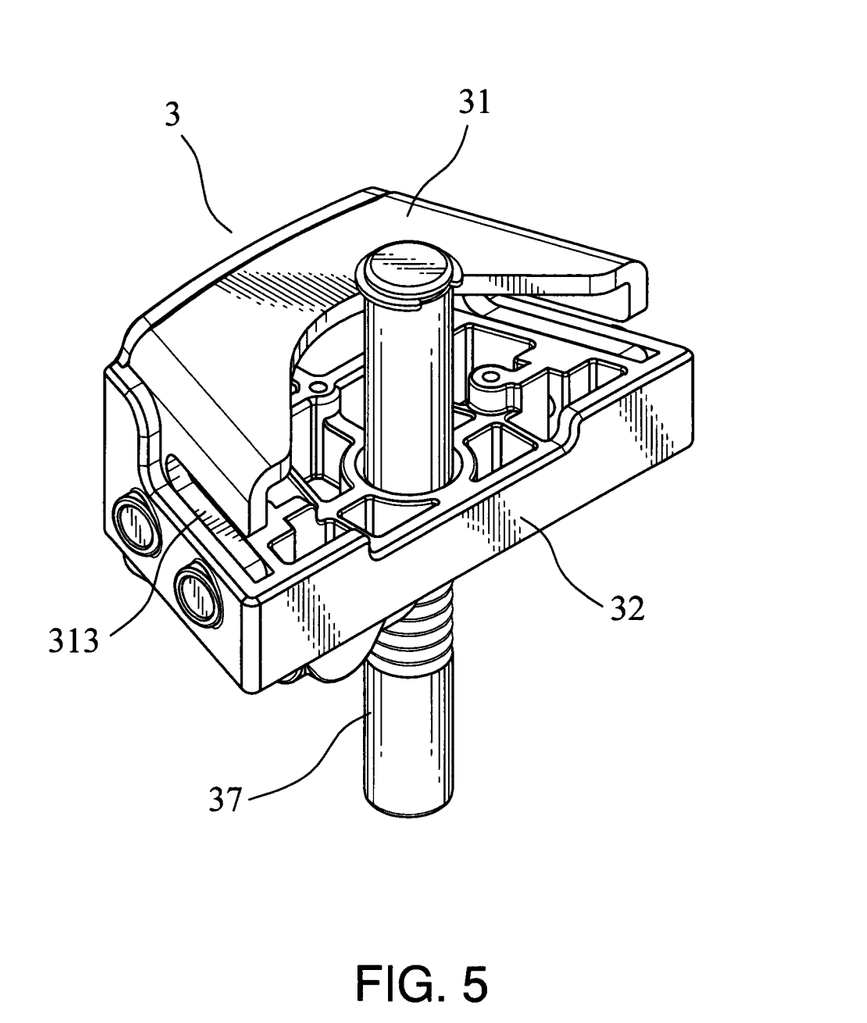
FIG. 5 is a three-dimensional diagram (1) of the present invention.
Figure 6:
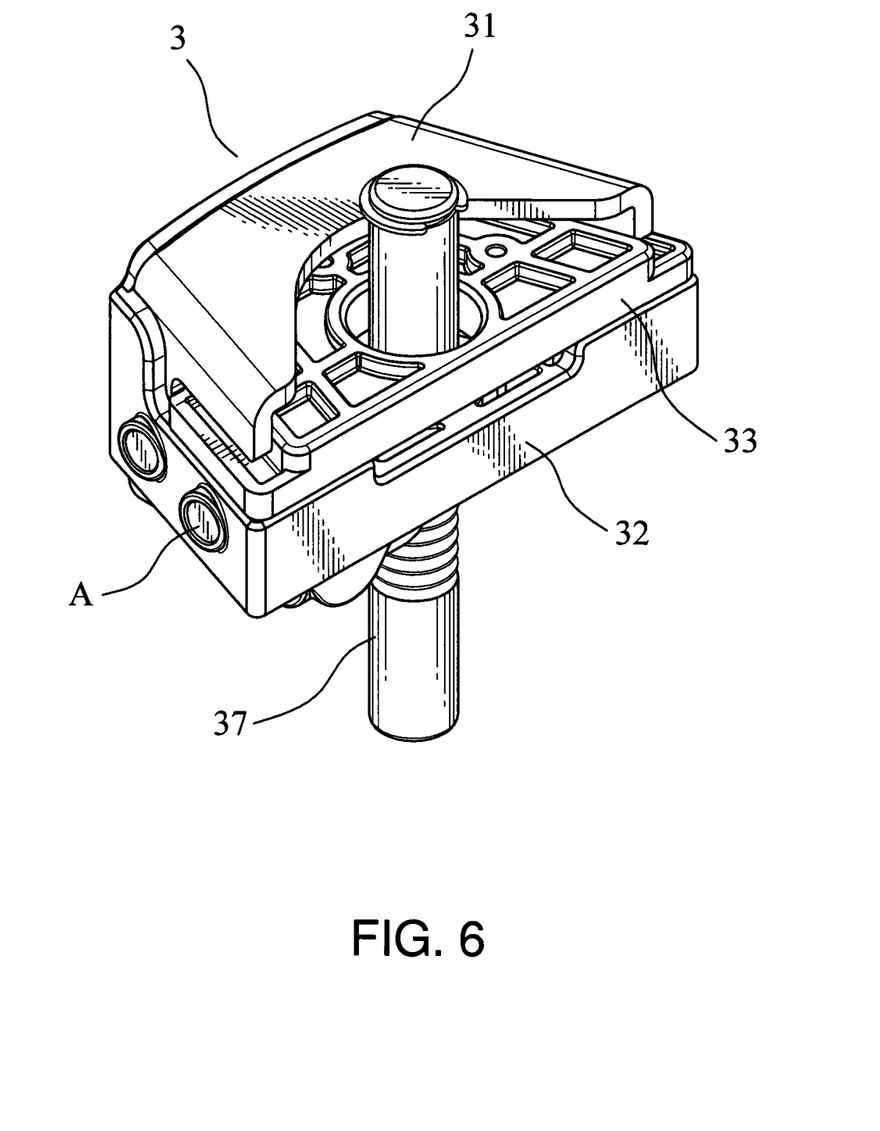
FIG. 6 is a three-dimensional schematic diagram (2) of the present invention.

For preventing from being stolen, a trailer lock 2 is usually used to lock on a coupler in front of the trailer. Since couplers may be roughly divided into three specifications: large size, medium size and small size, a general trailer lock applied for a medium-sized or small-sized coupler 1 could not be provided for large-sized coupler 1 to lock, otherwise, a trailer lock applied for a large-sized coupler 1 could not be provided for a medium-sized or small-sized coupler to lock. The following problem may be caused in this condition:

1. For the market demand for the use, manufacturers may produce trailer lock 2 with at least two different specifications, thus, preparation costs and inventory space may significantly increase.

2. For dealers, there are many specifications of trailer locks made by various manufacturers, however, other related goods may also be displayed in limited space, the products with various specifications may only be occupied display space of other products, and stored space may also increase, so that purchase intention of dealers may be affected.

3. For users, while changing to another trailer, if specification of the couplers 1 are different, the trailer lock 2 should be changed, it is not eligible for benefits.

SUMMARY OF THE INVENTION

In view of this, the inventor finally completes the universal trailer lock of the present invention after numerous improvements, namely, the object of the present invention is to provide a universal trailer lock for tightly locking on a trailer coupler, which is applied to trailer couplers with different specifications for effectively prevent trailers from being stolen.

To achieve the above object according to the invention, an universal trailer lock of the present invention is consisted of an upper housing, a lower housing, a lock barrel set and a latch.

The upper housing, which includes a concave space, two side arms are extended from two sides of the upper housing respectively, a limiting groove is set on each side arm.

The lower housing, which is provided to set on the upper housing correspondingly, a lock barrel chamber, a locking block chamber and a latch through hole are set inside the lower housing, a side of the lock barrel chamber is communicated with the locking block chamber, a first elastic element and a locking block are set in the locking block chamber, an locking part is set on an end of the locking block, and a groove is set on a peripheral edge of the locking block.

The lock barrel set, which is placed in the lock barrel chamber, the lock barrel set includes a lever for inserting into the groove of the locking block, to drive the locking block for sliding.

The latch, which is a rod body, is provided to insert into the latch through hole of the lower housing, at least a slot set on a peripheral edge of the latch is provided for the locking part of the locking block to embed into for locking.

The upper housing, at least a fixing hole is set on its side arm.

The latch, a fastening slot is set on a side of the latch, which is provided for a C-type elastic fastener to fix on it.

The universal trailer lock of the present invention further includes a limit separator, a through hole is set in the center of the limit separator, two embedded parts are respectively set on two sides of the limit separator to embed into the limiting grooves of the upper housing, at least a positioning hole is set on the limit separator.

The lower housing, at least a ball pocket is set on it, a positioning set is placed inside the ball pocket, the positioning set is consisted of a ball, a second spring and a fixed block.

At least a fixing hole is set on two sides of the lower housing, the fixing hole is corresponded to the fixing hole of the side arms of the upper housing for a corresponding fixed element to insert into to fasten.

DETAILED DESCRIPTION OF THE INVENTION

Please refer to FIG. 2 to FIG. 6, the universal trailer lock 3 of the present invention, which is consisted of an upper housing 31, a lower housing 32, a lock barrel set 34 and a latch 37.

The upper housing 31 includes a concave space 310, two side arms 311 are extended from two sides of the upper housing 31 respectively, at least a fixing hole 312 and a limiting groove are set on each side arm 311.

The lower housing 32 is set on the upper housing 31 correspondingly, a lock barrel chamber 321, a locking block chamber 322 and a latch through hole 323 are set inside the lower housing 32, a side of the lock barrel chamber 321 is communicated with the locking block chamber 322, a first elastic element S1 and a locking block 35 are set in the locking block chamber 322, an locking part 351 is set on an end of the locking block 35, and a groove 352 is set on a peripheral edge of the locking block 35.

The lock barrel set 34, which is placed in the lock barrel chamber 321, the lock barrel set 34 includes a lever 341 for inserting into the groove 352 of the locking block 35, to drive the locking block 35 for sliding (the structure of the lock barrel set 34 is prior art, not described in details here.)

The latch 37, which is a rod body, is provided to insert into the latch through hole 323 of the lower housing 32, a fastening slot 371 is set on a side of the latch 37, the fastening slot 371 is provided for a C-type elastic fastener 38 to fix on it, at least a slot 372 set on a peripheral edge of the latch 37 is provided for the locking part 351 of the locking block 35 to embed into for locking.

The present invention further includes a limit separator 33, a through hole 331 is set in the center of the limit separator 33, two embedded parts 332 are respectively set on two sides of the limit separator 33 to embed into the limiting grooves 313 of the upper housing 31, at least a positioning hole D is set on the limit separator 33.

Figure 10:
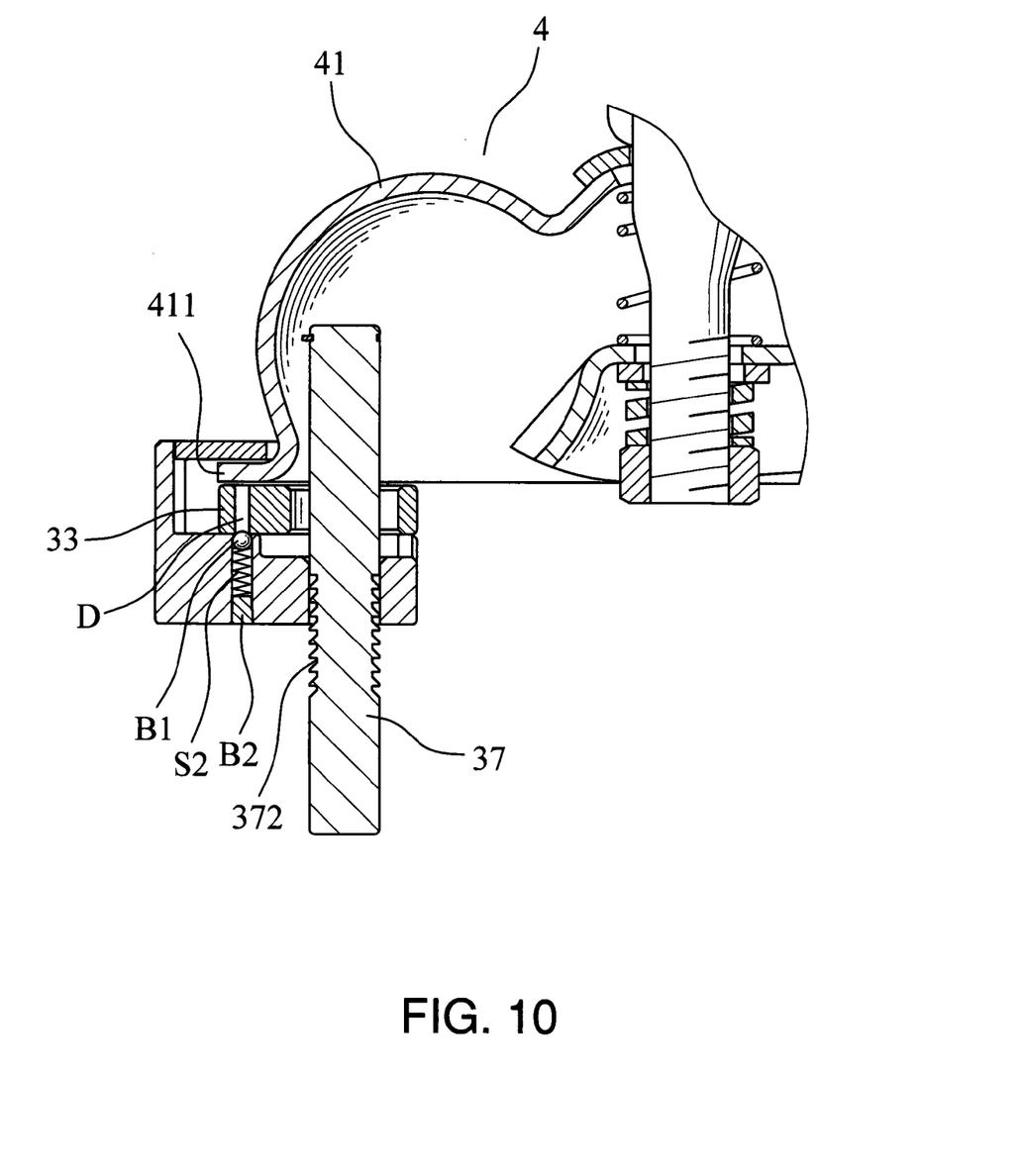
FIG. 10 is a schematic diagram of the operation of the positioning set of the present invention.

The lower housing 32, at least a ball pocket 324 is set on it, which is corresponded to the at least a positioning hole D of the limit separator 33, a positioning set 36 is placed inside the ball pocket 324, the positioning set 36 is consisted of a ball B1, a second spring S2 and a fixed block B2. The ball B1 is embedded into the positioning hole D for limiting (as shown in FIG. 10).

The lower housing 32, at least a fixing hole 325 is set on its two sides, the fixing hole 325 is corresponded to the fixing hole 312 of the side arms 311 of the upper housing 31 for a corresponding fixed element A to insert into to fasten.

By the composition of above elements, if the coupler 4 in front of a trailer is large-sized (please refer to FIG. 5 and FIG. 7), the limiting groove 313 of the upper housing 31 is provided to place an edge portion 41 of the coupler 4, thus the limit separator 33 could not be used, at this time, the limit separator 33 could be took out from the limiting groove 313 first. If the coupler 4 is medium-sized or small-sized, the limit separator 33 should be used (please refer to FIG. 6 and FIG. 8), the concave space 310 of the upper housing 31 is provided to place the edge portion 41 of the coupler 4, and the limit separator 33 could be limited without escaping the limiting groove 313 of the upper housing 31 by embedding the ball B1 of the positioning set 36 into the positioning hole D.

Figure 7:
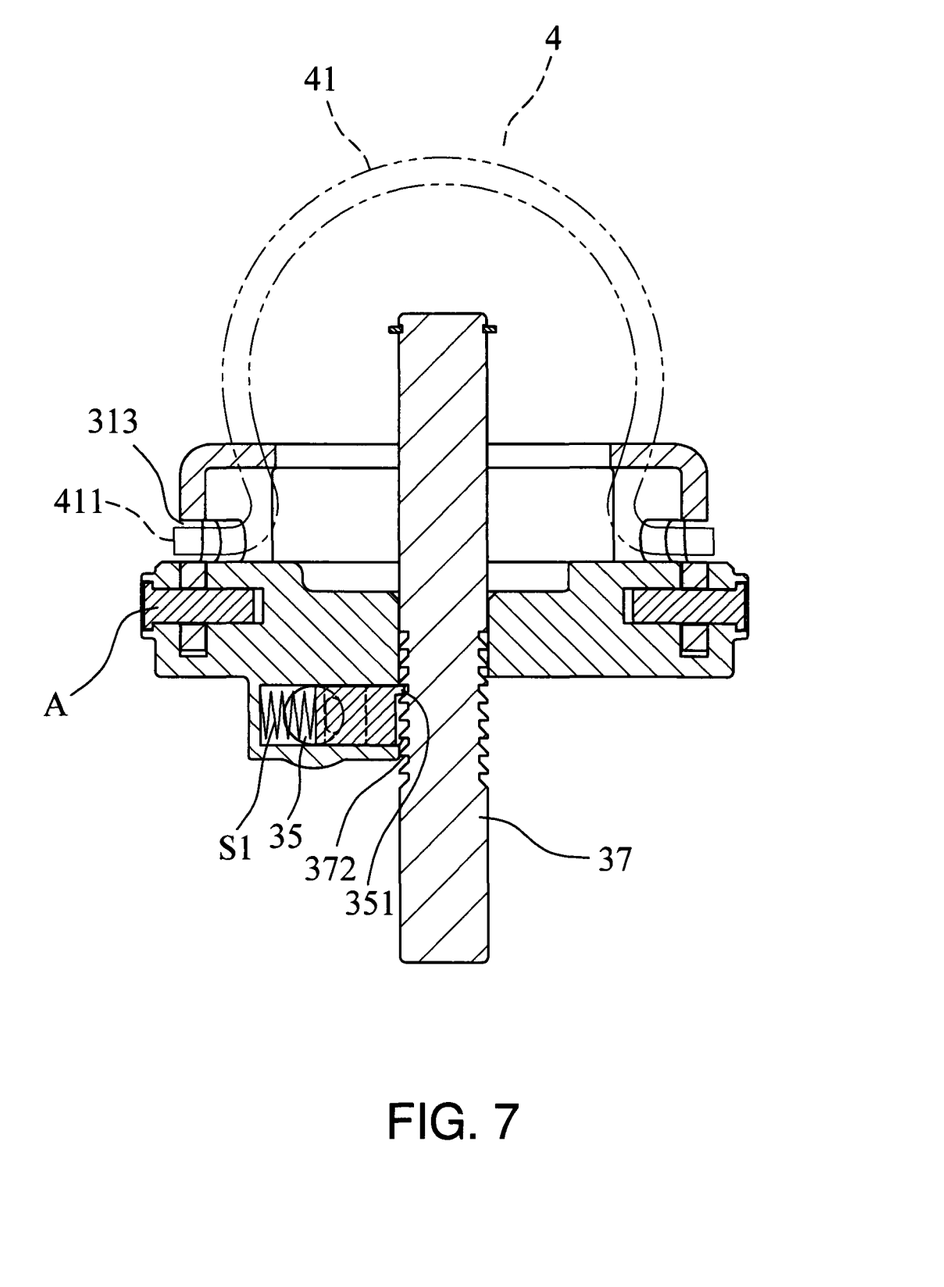
FIG. 7 is a schematic diagram (1) of the lock mode of the present invention.
Figure 8:
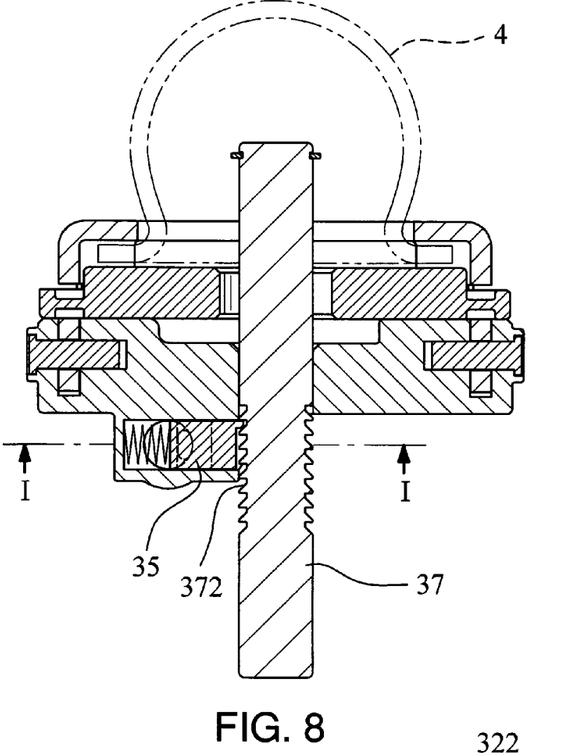
FIG. 8 is a schematic diagram (2) of the lock mode of the present invention.
Figure 9:
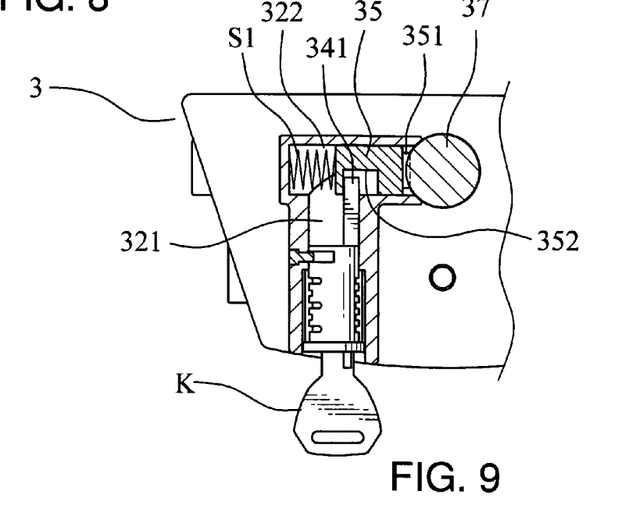
FIG. 9 is a I-I cross-sectional schematic diagram of FIG. 8 of the present invention.

In the present invention, when locking, no matter what the coupler 4 is a large-sized, medium-sized or small-sized specification, its edge portion 41 may be corresponded to the concave space 310 of the upper housing 31 (for a medium-sized, small-sized specification, please refer to FIG. 8), or to the limiting groove 313 (for large-sized specification, please refer to FIG. 7). And then a user could insert a key K to rotate the lock barrel set 34, the lever 341 is driven to push the locking block 35 sliding, at this time, the first elastic element S1 helps the locking block 35 pushing outwards by its elasticity, and the locking part 351 is embedded into the slot 372 of the latch 37, and the locking mode is implemented (a medium-sized, small-sized coupler is illustrated as an locking example herein, as shown in FIG. 8 and FIG. 9).

Figure 11:
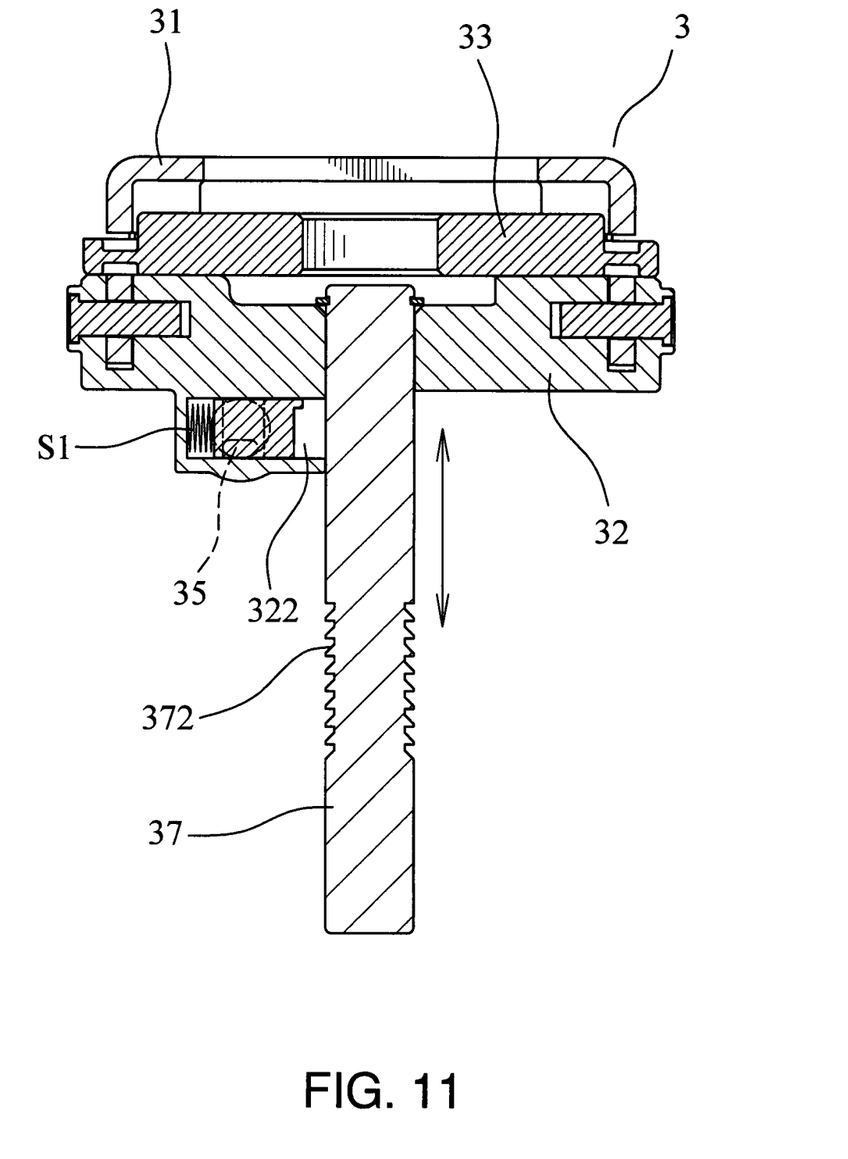
FIG. 11 is a schematic diagram of unlocking mode of the present invention.

In the present invention, when unlocking (please refer to FIG. 11, a medium-sized, small-sized coupler is illustrated as an unlocking example herein), a user insert the key k to reversely rotate the lock barrel set 34 first, the lever 341 is driven to push the locking block 35 sliding reversely, the locking block 35 compresses the first elastic element S1, the locking part 351 exits the slot 372 of the latch 37, and the unlocking mode is implemented.

What is claimed is:

1. A universal trailer lock, which is consisted of an upper housing, a lower housing, a lock barrel set and a latch, wherein:
    the upper housing, which includes a concave space, two side arms are extended from two sides of the upper housing respectively, a limiting groove is set on each side arm;
    the lower housing, which is provided to set on the upper housing correspondingly, a lock barrel chamber, a locking block chamber and a latch through hole are set inside the lower housing, a side of the lock barrel chamber is communicated with the locking block chamber, a first elastic element and a locking block are set in the locking block chamber, a locking part is set on an end of the locking block, and a groove is set on a peripheral edge of the locking block;
    the lock barrel set, which is placed in the lock barrel chamber, the lock barrel set includes a lever for inserting into the groove of the locking block, to drive the locking block for sliding;
    the latch is provided to insert into the latch through hole of the lower housing, at least one slot is set on a peripheral edge of the latch is provided for the locking part of the locking block to embed into for locking.

2. The universal trailer lock as claimed in claim 1, wherein at least one fixing hole is set on the side arm of the upper housing.

3. The universal trailer lock as claimed in claim 1, wherein a fastening slot is set on a side of the latch, which is provided for a C-Ring elastic fastener to fix on it.

4. The universal trailer lock as claimed in claim 1, further includes a limit separator, a through hole is set in a center of the limit separator, two embedded parts are respectively set on the two sides of the limit separator to embed into the limiting grooves of the upper housing, at least one positioning hole is set on the limit separator.

5. The universal trailer lock as claimed in claim 1, wherein at least one ball pocket is set on the lower housing, a positioning set is placed inside the at least one ball pocket, the positioning set is consisted of a ball, a second spring and a fixed block.

6. The universal trailer lock as claimed in claim 1, wherein at least one fixing hole is set on the two sides of the lower housing, the at least one fixing hole is corresponded to the at least one fixing hole of the side arms of the upper housing for a corresponding fixed element to insert.

* * * * *